US009523324B2

(12) United States Patent
Ramundo et al.

(10) Patent No.: US 9,523,324 B2
(45) Date of Patent: Dec. 20, 2016

(54) METHOD OF CONTROLLING THE FUEL INJECTION IN AN INTERNAL COMBUSTION ENGINE

(71) Applicant: GM GLOBAL TECHNOLOGY OPERATIONS LLC, Detroit, MI (US)

(72) Inventors: Fabio Ramundo, St. Gallen (CH); Valerio Nuzzo, Turin (IT); Fabrizio Abrate, Turin (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 304 days.

(21) Appl. No.: 14/459,010

(22) Filed: Aug. 13, 2014

(65) Prior Publication Data

US 2015/0051813 A1 Feb. 19, 2015

(30) Foreign Application Priority Data

Aug. 13, 2013 (GB) .................................. 1314458.9

(51) Int. Cl.
*G06F 7/00* (2006.01)
*G06F 17/00* (2006.01)
(Continued)

(52) U.S. Cl.
CPC ....... *F02D 41/3005* (2013.01); *F02D 41/0085* (2013.01); *F02D 41/04* (2013.01);
(Continued)

(58) Field of Classification Search
CPC .. F02D 41/40; F02D 41/2422; F02D 41/2467; F02D 41/2416; F02D 2200/0614; F02D 41/3005;F02D 41/0085; F02D 41/04; Y02T 10/44; F02B 2075/1816
See application file for complete search history.

(56) References Cited

U.S. PATENT DOCUMENTS 4,676,215 A * 6/1987 Blocher .............. F02D 41/1408 123/339.19
4,901,240 A * 2/1990 Schmidt .............. F02D 41/2454 123/438

(Continued)

FOREIGN PATENT DOCUMENTS

JP 2004346819 A 12/2004

*Primary Examiner* — Stephen K Cronin
*Assistant Examiner* — David Hamaoui
(74) *Attorney, Agent, or Firm* — Lorenz & Kopf LLP

(57) ABSTRACT

A method and apparatus for controlling fuel injection in an internal combustion engine is disclosed which controls a fuel injection pressure and a fuel injection energizing time, by using as input parameter an estimated corrected injector fuel quantity ($Q_{crtd}$). In particular, an injector fuel quantity deviation ($\Delta Q_{CB}$) corresponding to a current engine operating point is estimated and stored in a corresponding point of a map, representing engine operating points defined in terms of injection pressure and injector fuel quantity values. The stored injector fuel quantity deviation ($\Delta Q_{stored}$) are spread or propagated to each map point. For each engine operating point, the corrected injector fuel quantity ($Q_{crtd}$) is calculated by blending estimated values of the injector fuel quantity deviation ($\Delta Q_{CB}$) with corresponding spread values of the stored injector fuel quantity deviation ($\Delta Q_{stored}$) and summing this result to corresponding target values of the injector fuel quantity ($Q_{target}$).

11 Claims, 3 Drawing Sheets

(51) Int. Cl.

| | |
|---|---|
| ***F02D 41/30*** | (2006.01) |
| ***F02D 41/04*** | (2006.01) |
| ***F02D 41/00*** | (2006.01) |
| *F02B 75/18* | (2006.01) |
| *F02D 41/24* | (2006.01) |

(52) U.S. Cl.

CPC .. *F02B 2075/1816* (2013.01); *F02D 41/2467* (2013.01); *F02D 2200/0614* (2013.01)

(56) References Cited

U.S. PATENT DOCUMENTS

| | | | | | |
|---|---|---|---|---|---|
| 5,024,199 | A * | 6/1991 | Abe | F02D 41/2445 | 123/674 |
| 5,224,461 | A * | 7/1993 | Nakaniwa | F02D 41/1495 | 123/688 |
| 5,464,000 | A * | 11/1995 | Pursifull | F02D 41/1476 | 123/674 |
| 5,713,332 | A * | 2/1998 | Adler | B60T 8/174 | 123/406.19 |
| 6,360,733 | B1 * | 3/2002 | Uberti Bona Blotto | F02D 41/008 | 123/486 |
| 6,684,851 | B1 | 2/2004 | Galtier et al. | | |
| 6,961,650 | B2 * | 11/2005 | Itoh | F02D 41/2416 | 701/104 |

* cited by examiner

METHOD OF CONTROLLING THE FUEL INJECTION IN AN INTERNAL COMBUSTION ENGINE

CROSS REFERENCE TO RELATED APPLICATION

This application claims priority to GB Patent Application No. 1314458.9 filed Aug. 13, 2013, which is incorporated herein by reference in its entirety.

TECHNICAL FIELD

The technical field relates to a method of controlling the fuel injection in an internal combustion engine.

BACKGROUND

It is known that modern engines are provided with a fuel injection system for directly injecting the fuel into the cylinders of the engine. The fuel injection system generally includes a fuel common rail and a plurality of electrically controlled fuel injectors, which are individually located in a respective cylinder of the engine and which are hydraulically connected to the fuel rail through dedicated injection lines.

The fuel injection control is a strategy of the engine management system, in order to ensure the engine performance in terms of available torque and reduced fuel consumption and emissions. Related to the present disclosure, the main strategies to compensate the fuel injection are: the so called "Cylinder Balancing" (CB), which performs cylinder-by-cylinder torque equalization, in other words makes sure that each injector delivers the same fuel quantity; the so called "End of line Injection Adjustment" (ETA), which compensates injectors spread at new; the Fuel Set-point Adaptation strategy (FSA), which compensate the injectors drift, during their lifetime. FSA strategy estimates the injection drift considering the intake air mass and the oxygen concentration in the exhaust gas and stores it in an adaptive map, defined in term of engine speed and fuel request.

In particular, the algorithm "Cylinder Balancing" helps the engine management system to maintain acceptable vibration, noise and emission levels during the vehicle lifetime, by means of a run-time balancing between the injectors fuel quantity. In other words, "Cylinder Balancing" purpose is the torque equalization of the mean effective pressure present in the combustion chamber, regardless the injectors drift, caused by the mileage accumulation and the injectors dispersion. The output of the "Cylinder Balancing" is an array of fuel corrections with respect to the nominal fuel, which is equal for all the cylinders.

The "Cylinder Balancing" strategy uses the crankshaft wheel signal, in particular the Electronic Control Unit receives as input the crankshaft angular accelerations related to each cylinder and a pure integral control calculates the fuel corrections to be applied to each cylinder. When an engine operating point change occurs, the "Cylinder Balancing strategy" has to converge again in the new operating point without any prediction term.

FIG. 3 shows a schematic of a known fuel injection control. A target injector fuel quantity ($Q_{target}$) which has to be equal for all the injectors in the engine is corrected by an injector fuel quantity deviation ($\Delta Q_{CB}$) which is estimated by the Cylinder Balancing algorithm. The corrected injector fuel quantity ($Q_{crtd}$) is then updated by taking into account the "End of line Injection Adjustment" and enters in the block 521, which calculates the injection parameters (injection pressure, energizing time) for each injector. Once the interactions between injectors and engine (i.e. the fuel injection and combustion) happen, a feedback signal is provided by the crank wheel in terms of instantaneous crankshaft angular accelerations, in other words in terms of maximum unbalanced torque ($\Delta M$). The cylinder balancing routine then transforms the unbalanced torque in a delta fuel to be compensated to each injector, in order to let them inject the same fuel quantity.

In case of high rate engine operating point transients, for example, engine start (both after soaking and after automatic engine stop) or fuel cutoff and pedal tip-in, the "Cylinder Balancing" convergence could not be as fast as desired. Moreover, in case of much disturbed transmission gears (i.e. resonances due to coupling dual mass flywheel and transmission) or rough roads, the "Cylinder Balancing" feedback signal could not be so clean to balance the injectors as well as desired. Finally, in case of injectors, which are drifting all in one direction, the "Cylinder Balancing" does not correct the average drift.

Therefore, a need exists for a method that controls the fuel injection in an internal combustion engines, particularly related to the balance of the injection quantities for each cylinder, and is able to overcome the above problems.

SUMMARY

The present disclosure provides a method and apparatus for controlling the injection quantity including a faster and reliable strategy for balancing the injected quantities in each cylinder of the engine. The methods and/or apparatus may be implemented in an engine, by a computer program and by a computer program product as further described herein.

In accordance with the method of controlling a fuel injection in an internal combustion engine, a fuel injection pressure and a fuel injection energizing time is controlled by using as an input parameter a corrected injector fuel quantity. The corrected injector fuel quantity is estimated as follows. An injector fuel quantity deviation ($\Delta Q_{CB}$) for a current engine operating point is estimated and stored in a corresponding map point of a map representing engine operating points which are defined by an injection pressure and an injector fuel quantity value applied at the engine operating point. The stored injector fuel quantity deviation ($\Delta Q_{stored}$) spread to each map point. The corrected injector fuel quantity ($Q_{crtd}$) for each engine operating point is calculated by blending the estimated value of the injector fuel quantity deviation ($\Delta Q_{CB}$) with a corresponding spread value of the stored injector fuel quantity deviation and summing this result to a corresponding target value of the injector fuel quantity ($Q_{target}$).

The apparatus is disclosed for controlling a fuel injection in an internal combustion engine having at least two cylinders and at least two fuel injectors. A fuel injection pressure and a fuel injection energizing time are controlled by using as an input parameter a corrected injector fuel quantity $Q_{crtd}$. The corrected injector fuel quantity $Q_{crtd}$is estimated in a controller configured to estimate an injector fuel quantity deviation ($\Delta Q_{CB}$) for a current engine operating point and store the injector fuel quantity deviation ($\Delta Q_{CB}$) in a corresponding map point of a map representing engine operating points which are defined by an injection pressure and an injector fuel quantity value applied at the engine operating point. The stored injector fuel quantity deviation ($\Delta Q_{stored}$) is stored to each map point. The controller is also configured to calculate the corrected injector fuel quantity ($Q_{crtd}$) for each engine operating point by blending the estimated value of the injector fuel quantity deviation ($\Delta Q_{CB}$) with a corresponding spread value of the stored injector fuel quantity deviation and sum this result to a corresponding target value of the injector fuel quantity ($Q_{target}$).

An advantage of the present fuel injection control, which let the injected fuel quantities to be balanced among the engine cylinders, decreases the time needed to reach a steady state of the corrections after a transient between two engine operating points. The transient may also include engine cranking and pedal tip-in after cut-off. This target is obtained by defining a map of the "Cylinder Balancing" corrections and filling it in a fast way by using the correction spread in each map point. Moreover, a further advantage is that the present fuel injection control allows torque equalization among cylinders also when a closed loop control is not allowed to work (for example, in case of noisy driveline and road), since an open loop correction is always available from the stored values of the injector fuel quantity deviation.

According to another embodiment of the present disclosure, the estimated injector fuel quantity deviation is controlled by means of a closed loop control. Consequently, the controller may be configured to control the estimated injector fuel quantity deviation by means of a closed loop control. An advantage of this embodiment is that, in order to fill the map of the corrections, it takes into account the differences of the instantaneous torque, due to unbalanced fuel quantities in the cylinders, and gets them smaller by means of the closed loop control.

According to a further embodiment of the present disclosure, the estimated injector fuel quantity deviation is stored in the map if a maximum unbalanced torque delivered by the cylinders is lower than a maximum unbalanced torque threshold. Consequently, the controller may be configured to store the injector fuel quantity deviation in the map if a maximum unbalanced torque of the cylinders is lower than a maximum unbalanced torque threshold. An advantage of this embodiment is that only reliable corrections are stored in the correction map. In fact, storing is performed in specific stationary points when the maximum estimated unbalancing is lower than a threshold. In other words, the cylinder balancing closed loop correction has reached a convergence.

According to still another embodiment of the present disclosure, the stored injector fuel quantity deviation is spread to the map points by multiplying it with a factor, the value of which decreases with a distance of the map point from the map point where the injector fuel quantity deviation has been stored. Consequently, the controller may be configured to multiply the stored injector fuel quantity deviation with a factor; the value of which decreases with a distance of the map point from the map point where said injector fuel quantity deviation has been stored. An advantage of this embodiment is that the correction map is filled in a reliable way. The stored correction may be input in each map point with a penalty coefficient which is proportional to the distance between the engine operating point correspondent to the stored correction and the current engine operating point where the correction is spread.

According to a still further embodiment the blending between the estimated values of the injector fuel quantity deviation with the spread values of the stored injector fuel quantity deviation is obtained by defining a percentage weight for both the injector fuel quantity deviation and the stored injector fuel quantity deviation. The stored injector fuel quantity deviation may be given a higher weight close to the engine operating point where it has been stored, and a lower weight far from said engine operating point. Consequently, the controller may be configured in a way that the blending between the estimated values of the injector fuel quantity deviation with the spread values of the stored injector fuel quantity deviation is obtained by defining a percentage weight for both the injector fuel quantity deviation and the stored injector fuel quantity deviation. The stored injector fuel quantity deviation may be given a higher weight close to the engine operating point, where it has been stored, and a lower weight far from said engine operating point. An advantage of this embodiment is that the fuel injection correction properly balances the closed loop control ("Cylinder Balancing" strategy) and the open loop control (by means of the stored values of the injector fuel quantity deviation). In fact, if the engine operating point is close to a point where the stored correction is available, then the predominant correction will be operated by the open loop contribution. On the contrary, if the engine operating point is far from a point where the stored correction is available, only a spread correction (with lower reliability) will be available. Therefore, the contribution of the open loop correction will be lowered, while the contribution of the instantaneous closed loop correction will be predominant.

According to another embodiment, a correction of the target injector fuel quantity is actuated before the blending to compensate injectors spread due to production tolerances. Consequently, the controller may be configured to compensate injectors spread due to production tolerances before said blending. An advantage of this embodiment is that the "Cylinder balancing" contribution is not affected by possible wrong "End of line Injector Adjustment" corrections.

According to a further embodiment, the stored injector fuel quantity deviation also includes an average correction of the injector fuel quantity. This correction may be evaluated by an oxygen sensor. Consequently, the controller may be configured to estimate the stored injector fuel quantity deviation, which includes an average correction of the injector fuel quantity. This correction may be evaluated by an oxygen sensor. An advantage of this embodiment is that it solves the problem caused when all injectors are drifting in one direction.

According to another embodiment, an internal combustion engine of an automotive system is disclosed, the engine provided with at least two cylinders, at least two fuel injectors and an oxygen sensor. The automotive system further includes an electronic control unit or controller configured for carrying out the method according to one of the previous embodiments. The method according to one of its aspects can be carried out with the aid of a computer program including a program-code for carrying out the method described above, and in the form of computer program product including the computer program. The computer program product can be embedded in a control apparatus for an internal combustion engine, including an Electronic Control Unit (ECU), a data carrier associated to the ECU. The computer program may be stored in a data carrier, so that the control apparatus or controller defines the embodiments described in the same way as the method. In this case, when the control apparatus executes the computer program for carrying out the method described above.

BRIEF DESCRIPTION OF THE DRAWINGS

The present disclosure will hereinafter be described in conjunction with the following drawing figures, wherein like numerals denote like elements.

DETAILED DESCRIPTION OF THE DRAWINGS

The following detailed description is merely exemplary in nature and is not intended to limit the present disclosure or the application and uses of the present disclosure. Furthermore, there is no intention to be bound by any theory presented in the preceding background or the following detailed description.

Figure 1:
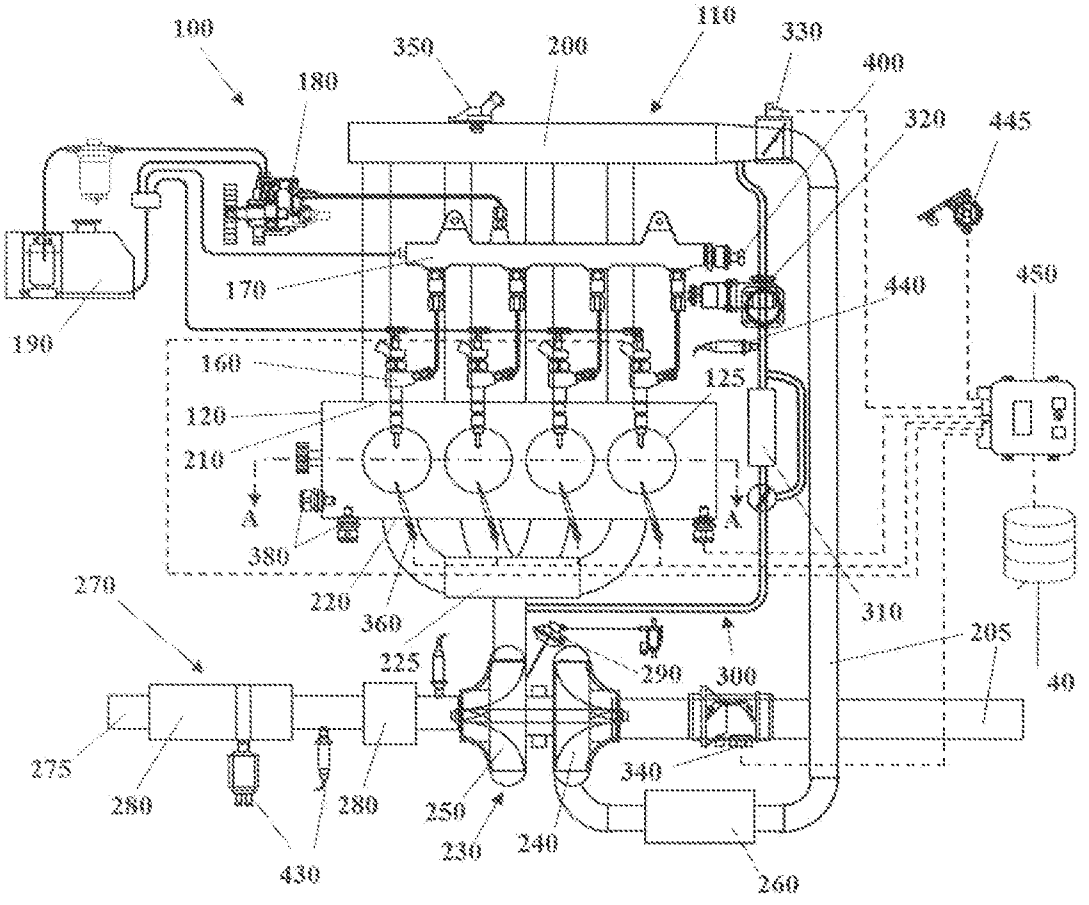
FIG. 1 shows an automotive system.
Figure 2:
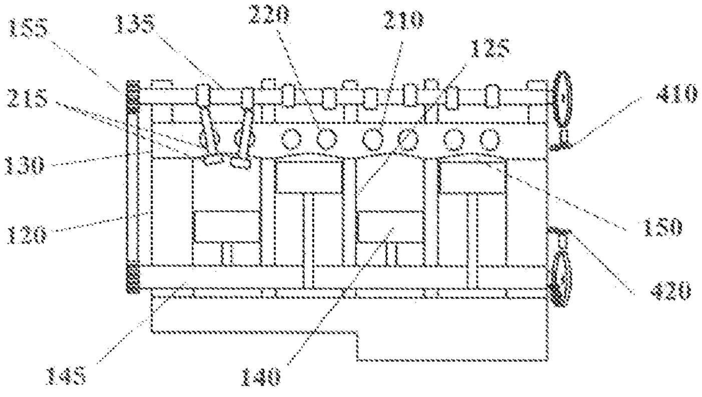
FIG. 2 is a section of an internal combustion engine belonging to the automotive system of FIG. 1.
Figure 3:
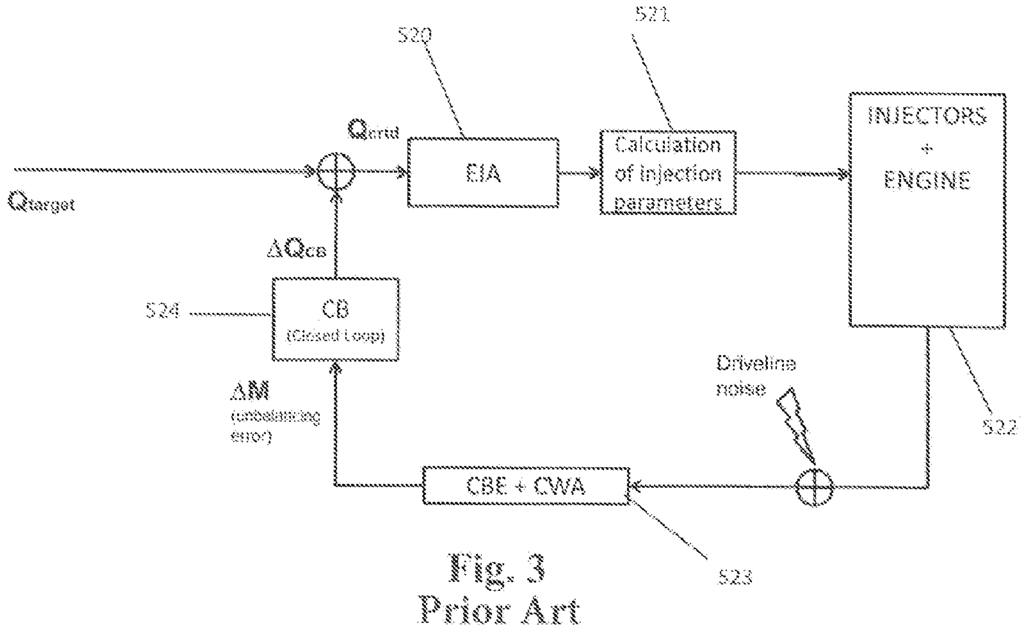
Fig. 3 Prior Art
FIG. 3 is a block diagram of a fuel injection control according to a conventional method.

Some embodiments may include an automotive system 100, as shown in FIGS. 1 and 2, that includes an internal combustion engine (ICE) 110 having an engine block 120 defining at least one cylinder 125 having a piston 140 coupled to rotate a crankshaft 145. A cylinder head 130 cooperates with the piston 140 to define a combustion chamber 150. A fuel and air mixture (not shown) is disposed in the combustion chamber 150 and ignited, resulting in hot expanding exhaust gasses causing reciprocal movement of the piston 140. The fuel is provided by at least one fuel injector 160 and the air through at least one intake port 210. The fuel is provided at high pressure to the fuel injector 160 from a fuel rail 170 in fluid communication with a high pressure fuel pump 180 that increase the pressure of the fuel received a fuel source 190. Each of the cylinders 125 has at least two valves 215, actuated by a camshaft 135 rotating in time with the crankshaft 145. The valves 215 selectively allow air into the combustion chamber 150 from the port 210 and alternately allow exhaust gases to exit through a port 220. In some examples, a cam phaser 155 may selectively vary the timing between the camshaft 135 and the crankshaft 145.

The air may be distributed to the air intake ports 210 through an intake manifold 200. An air intake duct 205 may provide air from the ambient environment to the intake manifold 200. In other embodiments, a throttle body 330 may be provided to regulate the flow of air into the manifold 200. In still other embodiments, a forced air system such as a turbocharger 230, having a compressor 240 rotationally coupled to a turbine 250, may be provided. Rotation of the compressor 240 increases the pressure and temperature of the air in the duct 205 and manifold 200. An intercooler 260 disposed in the duct 205 may reduce the temperature of the air. The turbine 250 rotates by receiving exhaust gases from an exhaust manifold 225 that directs exhaust gases from the exhaust ports 220 and through a series of vanes prior to expansion through the turbine 250. The exhaust gases exit the turbine 250 and are directed into an exhaust system 270. This example shows a variable geometry turbine (VGT) with a VGT actuator 290 arranged to move the vanes to alter the flow of the exhaust gases through the turbine 250. In other embodiments, the turbocharger 230 may be fixed geometry and/or include a waste gate.

The exhaust system 270 may include an exhaust pipe 275 having one or more exhaust after-treatment devices 280. The after-treatment devices may be any device configured to change the composition of the exhaust gases. Some examples of after-treatment devices 280 include, but are not limited to, catalytic converters (two and three way), oxidation catalysts, lean NOx traps, hydrocarbon adsorbers, selective catalytic reduction (SCR) systems, and particulate filters. Other embodiments may include an exhaust gas recirculation (EGR) system 300 coupled between the exhaust manifold 225 and the intake manifold 200. The EGR system 300 may include an EGR cooler 310 to reduce the temperature of the exhaust gases in the EGR system 300. An EGR valve 320 regulates a flow of exhaust gases in the EGR system 300.

The automotive system 100 may further include an electronic control unit (ECU) 450 in communication with one or more sensors and/or devices associated with the ICE 110 and equipped with a data carrier 40. The ECU 450 may receive input signals from various sensors configured to generate the signals in proportion to various physical parameters associated with the ICE 110. The sensors include, but are not limited to, a mass airflow and temperature sensor 340, a manifold pressure and temperature sensor 350, a combustion pressure sensor 360, coolant and oil temperature and level sensors 380, a fuel rail pressure sensor 400, a cam position sensor 410, a crank position sensor 420, exhaust pressure, temperature and oxygen sensors 430, an EGR temperature sensor 440, and an accelerator pedal position sensor 445. Furthermore, the ECU 450 may generate output signals to various control devices that are arranged to control the operation of the ICE 110, including, but not limited to, the fuel injectors 160, the throttle body 330, the EGR Valve 320, the VGT actuator 290, and the cam phaser 155. It should be noted that dashed lines are used to indicate communication between the ECU 450 and the various sensors and devices, but some are omitted for clarity.

Turning now to the ECU 450, this apparatus may include a digital central processing unit (CPU) in communication with a memory system and an interface bus. The CPU is configured to execute instructions stored as a program in the memory system, and send and receive signals to/from the interface bus. The memory system may include various storage types including optical storage, magnetic storage, solid state storage, and other non-volatile memory. The interface bus may be configured to send, receive, and modulate analog and/or digital signals to/from the various sensors and control devices. The program may embody the methods disclosed herein, allowing the CPU to carryout out the methods and control the ICE 110.

The program stored in the memory system is transmitted from outside via a cable or in a wireless fashion. Outside the automotive system 100 it is normally visible as a computer program product, which is also called computer readable medium or machine readable medium in the art, and which should be understood to be a computer program code residing on a carrier, the carrier being transitory or non-transitory in nature with the consequence that the computer program product can be regarded to be transitory or non-transitory in nature.

An example of a transitory computer program product is a signal, e.g. an electromagnetic signal such as an optical signal, which is a transitory carrier for the computer program code. Carrying such computer program code can be achieved by modulating the signal by a conventional modulation technique such as QPSK for digital data, such that binary data representing said computer program code is impressed on the transitory electromagnetic signal. Such signals are e.g. made use of when transmitting computer program code in a wireless fashion via a WiFi connection to a laptop.

In case of a non-transitory computer program product, the computer program code is embodied in a tangible storage medium. The storage medium is then the non-transitory carrier mentioned above, such that the computer program code is permanently or non-permanently stored in a retrievable way in or on this storage medium. The storage medium can be of conventional type known in computer technology such as a flash memory, an Asic, a CD or the like.

Instead of an ECU 450, the automotive system 100 may have a different type of processor to provide the electronic logic, e.g. an embedded controller, an onboard computer, or any processing module that might be deployed in the vehicle.

Figure 4:
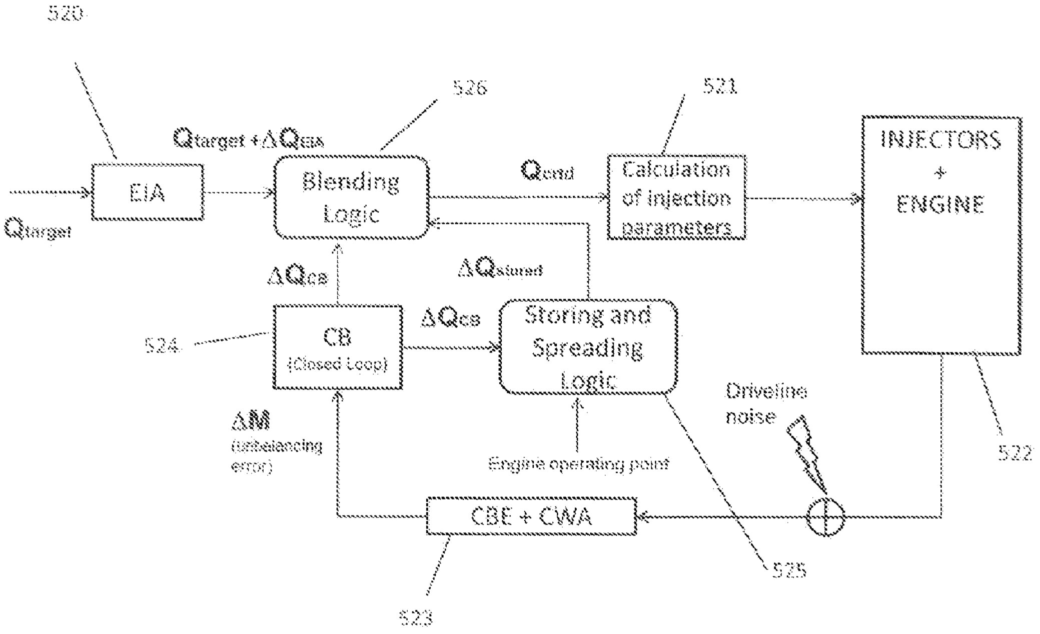
FIG. 4 is a block diagram of an improved fuel injection control, according to an embodiment of the present disclosure.

FIG. 4 shows the improvement to the injection control, according to an embodiment of the present disclosure. To have a faster and more reliable strategy for balancing the injected quantities in each cylinder of the engine, an improved functionality has been implemented. The function receives and stores "Cylinder Balancing" corrections in specific engine operating points (defined by injection pressure and fuel quantity) and releases the stored corrections properly blended with the instantaneous ones.

Figure 5:
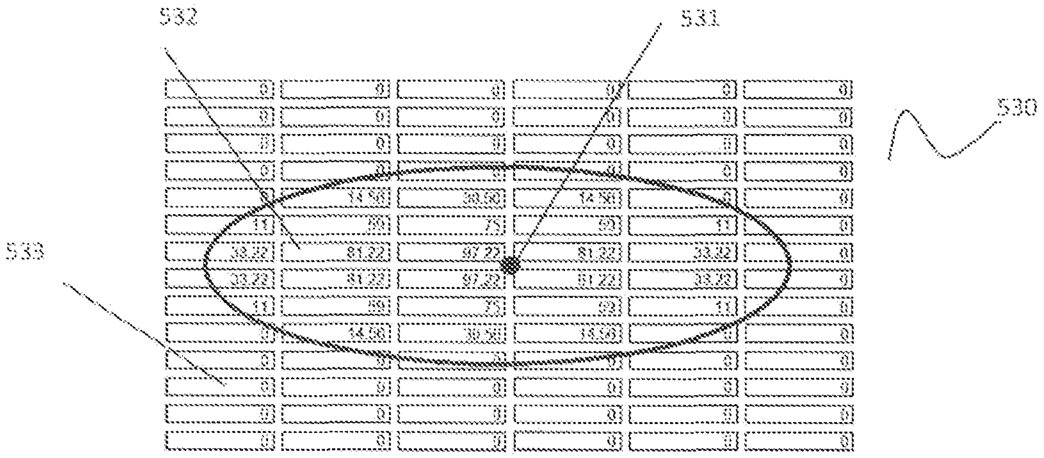
FIG. 5 is a schematic showing a map where the fuel quantity deviations are stored and spread to adjacent regions.

In order to implement this improved functionality, a map 530 (see FIG. 5) is generated (one map for each engine cylinder/injector) which represents engine operating points defined in terms of injection pressure and injector fuel quantity. The map has to be filled with the cylinder balancing corrections. Therefore, once the "Cylinder Balancing" routine has estimated an injector fuel quantity deviation $\Delta Q_{CB}$ at block 524, such value is stored in the map 530 at block 525. The enabling conditions for such a value to be stored in the map are that the engine is warmed up and operates in a steady state. Moreover, the "Cylinder Balancing" closed loop control shall have reached the convergence. In other words, the injector fuel quantity deviation $\Delta Q_{CB}$ is stored in the map 530, if the maximum unbalanced torque AM is lower than a calibrated maximum unbalanced torque threshold $\Delta M_{th}$. For unbalanced torque is to be understood the torque difference between whatever cylinder couple. The stored injector fuel quantity deviation, which will be referenced as $\Delta Q_{stored}$, can be used as open loop correction of the injector fuel quantity.

The map may be filled in a fast and reliable way without waiting for the correction storage of each engine operating point. In other words, the idea is to extend the stored corrections to the map points not reachable or still not reached in steady-state. This is realized by spreading the already stored injector fuel quantity deviation $\Delta Q_{stored}$ to the map points. Such spreading is realized in a very reliable way. For example, spread criterion may be to multiply the stored value with a percentage, lower than 100%, which decreases according to the distance, calculated on the map 530, from the engine operating point, where the injector fuel quantity deviation has been stored. In the portion of the map 530 shown in FIG. 5, for example, the stored value 531 of the injector fuel quantity deviation is spread (in other words, is propagated) to the map and will be used as an open loop correction of the target injector fuel quantity. In particular, in an adjacent region 532 of the map, each point of such region has a different percentage (for example, 97.22, 81.22, 33.22 and so on), which decreases with the distance from the engine operating point, corresponding to the stored value 531. On the contrary, in far regions 533, the percentage is zero and the stored value will be spread assuming a zero value. The definition of adjacent region and far region depends on the specific engine application and can be defined by means of calibration activities.

In addition, a corrected injector fuel quantity $Q_{crtd}$ may be calculated, by blending 526 the estimated values of the injector fuel quantity deviation $\Delta Q_{CB}$ with the stored (and spread) values of the injector fuel quantity deviation $\Delta Q_{stored}$. The blending logic (in other words, a mixing or a combination logic), between the estimated values of the injector fuel quantity deviation $\Delta Q_{CB}$ and the stored values of the injector fuel quantity deviation $\Delta Q_{stored}$, operates by defining a percentage weight of said injector fuel quantities $\Delta Q_{CB}$, $\Delta Q_{stored}$. The latter ($\Delta Q_{stored}$) has a higher weight close to the engine operating point, where stored, and a lower weight far from said engine operating point. Preferably, such blending logic allows linear combination of stored corrections, which are released in open loop, and instantaneous corrections, coming from the "Cylinder Balancing" closed loop control. The result of the blending operation is then summed to the target injector fuel quantity Qtarget and will provide the corrected injector fuel quantity $Q_{crtd}$.

Advantageously, the present method can also require a change in the interaction between "Cylinder Balancing" control and "End of line Injection Adjustment." The target injector fuel quantity ($Q_{target}$) can be corrected by taking into account the "End of line Injection Adjustment" as indicated at block 520 before the above described steps. In this case, the injector fuel quantity to be corrected with the contribution of the blending logic will be:

$$Q_{target}+\Delta Q_{EIA}$$

where:

Qtarget=target injector fuel quantity $\Delta Q_{EIA}$=fuel quantity contribute due to the EIA adjustment In fact, if the EIA correction of the target injector fuel quantity ($Q_{target}$) is actuated before the blending logic shown at block 526, the "Cylinder balancing" contribute is not affected by possible wrong EIA corrections. This leads to better performance in transient conditions and possibility to recover quantity deviations, due to wrong EIA correction.

The corrected injector fuel quantity $Q_{crtd}$ then enters in the block 521, which calculates the injection parameters (injection pressure, energizing time) for each of the injectors. Once the interactions between injectors and engine (i.e. the fuel injection and combustion) happen at block 522, a feedback signal is provided at block 523 by the crank wheel in terms of instantaneous crankshaft angular accelerations, in other words in terms of unbalanced torque ΔM. Finally, the maximum unbalanced torque ΔM is transformed in an injector fuel quantity deviation $\Delta Q_{CB}$ estimated at block 524 by the "Cylinder Balancing" algorithm.

In some engine operating points, above all in idle conditions, the open loop correction (i.e. the correction by means of the stored values of the injector fuel quantity deviation) could also take into account the average correction of the injector fuel quantity, evaluated by the oxygen sensor 430. This solves the problem caused when all injectors are drifting in one direction (for example, all fuel quantities increase, due to injectors ageing).

Summarizing, the described methods which uses the mutual contributions of the closed loop control and the stored open loop corrections, ensures a shorter convergence time of the control strategy, during transient between two engine operating points, and provides good unbalancing compensation in case of closed loop performance degradation, due to driveline or road noise.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents.

The invention claimed is:

1. A method of controlling a fuel injection in an internal combustion engine of the type having at least two cylinders and at least two fuel injectors, the method comprising:

defining a map having a plurality of map points, each map point corresponding to an engine operating point defined by an injection pressure and an injector fuel quantity value applied at said engine operating point;

estimating an injector fuel quantity deviation for a current engine operating point;

storing said injector fuel quantity deviation in a corresponding map point of the map;

spreading said stored injector fuel quantity deviation to a map point corresponding to each engine operating point;

calculating a corrected injector fuel quantity for each engine operating point by blending the estimated value of the injector fuel quantity deviation with a corresponding spread value of the stored injector fuel quantity deviation and summing said corrected injector fuel quantity with a corresponding target value of the injector fuel quantity; and controlling a fuel injection pressure and a fuel injection energizing time by using said corrected injector fuel quantity as an input parameter.

2. The method according to claim 1, further comprising controlling said estimated injector fuel quantity deviation using a closed loop control.

3. The method according to claim 1, further comprising storing said estimated injector fuel quantity deviation in the map if a maximum unbalanced torque delivered by the cylinders is lower than a maximum unbalanced torque threshold.

4. The method according to claim 1, wherein spreading said stored injector fuel quantity deviation to a map comprises multiplying said stored injector fuel quantity with a factor, wherein a value of the factor decreases with an increasing distance of the map point from the map point where said injector fuel quantity deviation has been stored.

5. The method according to claim 1, wherein blending between the estimated values of the injector fuel quantity deviation with the spread values of the stored injector fuel quantity deviation is obtained by defining a percentage weight for both the injector fuel quantity deviation and the stored injector fuel quantity deviation having the stored injector fuel quantity deviation, wherein a higher weight is defined close to said engine operating point where it has been stored and a lower weight is defined far from said engine operating point where it has been stored.

6. The method according to claim 1, wherein further comprising correcting the target injector fuel quantity before said blending.

7. The method according to claim 1, wherein said stored injector fuel quantity deviation comprises an average correction of the injector fuel quantity.

8. An internal combustion engine of an automotive system of the type having at least two cylinders, at least two fuel injectors, an oxygen sensor and an electronic control unit configured to carry out the method according to claim 1.

9. A computer program comprising a computer-code suitable for performing the method according to claim 1.

10. Computer program product on which the computer program according to claim 9 is stored.

11. A control apparatus for an internal combustion engine, comprising an electronic control unit, a data carrier associated to the electronic control unit and a computer program according to claim 9 stored in the data carrier.

* * * * *